(12) United States Patent
Vesely

(10) Patent No.: US 11,291,187 B2
(45) Date of Patent: Apr. 5, 2022

(54) SIDE LEAD ANIMAL HARNESS

(71) Applicant: Matthew A Vesely, Gilbert, AZ (US)

(72) Inventor: Matthew A Vesely, Gilbert, AZ (US)

( * ) Notice: Subject to any disclaimer, the term of this patent is extended or adjusted under 35 U.S.C. 154(b) by 130 days.

(21) Appl. No.: 15/912,238

(22) Filed: Mar. 5, 2018

(65) Prior Publication Data

US 2019/0269101 A1 Sep. 5, 2019

(51) Int. Cl.
*A01K 27/00* (2006.01)
*A01K 15/04* (2006.01)

(52) U.S. Cl.
CPC .......... *A01K 27/002* (2013.01); *A01K 15/04* (2013.01); *A01K 27/003* (2013.01)

(58) Field of Classification Search
CPC .... A01K 27/00; A01K 27/002; A01K 27/003; A01K 15/04
USPC .......................................... 119/769, 792, 793
See application file for complete search history.

(56) References Cited

U.S. PATENT DOCUMENTS

| | | | | |
|---|---|---|---|---|
| 1,614,083 A | | 10/1926 | Plantico | |
| 2,233,397 A | * | 3/1941 | Bloom | A01K 27/002 119/857 |
| 2,289,802 A | * | 7/1942 | Norton | A01K 27/003 119/793 |
| 2,458,489 A | * | 1/1949 | Hallander | A01K 27/001 119/793 |
| 2,826,172 A | * | 3/1958 | Buckle | A01K 15/04 D30/152 |
| 3,872,833 A | * | 3/1975 | Herbert | A01K 27/001 119/864 |
| D378,150 S | | 2/1997 | DuBarry | |
| 5,893,339 A | | 4/1999 | Liu | |
| D511,596 S | * | 11/2005 | Mugford | D30/152 |
| 7,066,113 B2 | * | 6/2006 | Cheng | A01K 27/001 119/863 |
| 7,165,511 B1 | * | 1/2007 | Brezinski | A01K 27/002 119/792 |
| 8,015,947 B2 | * | 9/2011 | Arreola | A01K 27/002 119/792 |
| 8,281,748 B2 | * | 10/2012 | Elkins | A01K 1/04 119/792 |
| D725,842 S | | 3/2015 | Spencer | |
| 9,271,476 B1 | * | 3/2016 | Flynn | A01K 27/002 |
| 9,301,505 B1 | * | 4/2016 | Luna | A01K 27/003 |
| 10,709,113 B2 | * | 7/2020 | O'Neill | A01K 15/02 |
| 11,160,256 B2 | * | 11/2021 | Connolly | A01K 27/005 |
| 2006/0102102 A1 | * | 5/2006 | Bennett | A01K 27/002 119/792 |
| 2007/0266960 A1 | * | 11/2007 | Mugford | A01K 27/002 119/792 |

(Continued)

FOREIGN PATENT DOCUMENTS

| CA | 2246080 | 3/2000 |
|---|---|---|
| DE | 20304940 | 3/2003 |

(Continued)

*Primary Examiner* — Lisa L Tsang
(74) *Attorney, Agent, or Firm* — Prudens Law LLC; Shawn Diedtrich

(57) ABSTRACT

An adjustable side lead animal harness with a top portion, bottom portion, and chest portion that are connected so that upon excessive pulling by the animal, the chest portion collapses bringing the animal's legs together to discourage pulling. A strap of the chest portion is threaded through a ring and doubled-back through a modified ring.

7 Claims, 4 Drawing Sheets

(56) References Cited

U.S. PATENT DOCUMENTS

| | | | |
|---|---|---|---|
| 2008/0047501 A1 | 2/2008 | Madere | |
| 2012/0192811 A1* | 8/2012 | Robinson | A01K 27/001 |
| | | | 119/862 |
| 2015/0007778 A1 | 1/2015 | Yamin | |
| 2016/0183496 A1* | 6/2016 | Wilson | A01K 27/003 |
| | | | 119/719 |
| 2017/0280685 A1* | 10/2017 | McCain | A01K 27/002 |
| 2018/0279581 A1* | 10/2018 | Dugan | A01K 27/00 |
| 2019/0075760 A1* | 3/2019 | Porter | A01K 27/003 |
| 2020/0375151 A1* | 12/2020 | Connolly | A01K 27/005 |
| 2020/0396963 A1* | 12/2020 | Cavallaro | A01K 27/001 |
| 2021/0076641 A1* | 3/2021 | DeRosa | A01K 27/003 |

FOREIGN PATENT DOCUMENTS

| | | | | |
|---|---|---|---|---|
| FR | 2142206 | 6/1971 | | |
| GB | 2481675 B | * 3/2013 | | A01K 27/002 |
| WO | WO-2009025018 A1 | * 2/2009 | | A01K 27/002 |

* cited by examiner

SIDE LEAD ANIMAL HARNESS

TECHNICAL FIELD

The present invention is generally related to animal harnesses.

BACKGROUND

As animal owners know, animals need to be walked. A common problem when walking an animal is that the animal will pull on the leash, sometimes excessively. Such pulling can cause discomfort and harm to the animal, especially to the throat and neck. A variety of leashes designed to minimize pulling are known in the prior art, including choke chains, harnesses, or specialized collars that attempt to restrain the animal in a number of ways.

However, the prior art leashes also fail in safely providing appropriate restraint to the animal. For example, various harness systems consist of straps that are placed underneath an animal, around the chest and/or throat area, or around the neck. A leash is then connected to the system that is designed to pull the harness system backwards with the intention to make the animal uncomfortable (including painful) if pulling becomes excessive. However, many animals will continue through the pain if necessary rendering the harness system ineffective, e.g., the owner stops pulling before the animal stops pulling. Many harnesses when pulled by an animal can ride up the chest of the animal to the throat, which may injure the animal. The activity of walking an animal then becomes a contest of who can pull the hardest on the harness system. Some harness system experiment with moving the point of attachment of the lease to the harness system. However, these have failed as well. The prior art systems merely change the location of attachment to the harness. They do not change the backwards pulling force, which again turns the walking activity into a tug of war. Thus, these systems fail to restrain the animal, and in some cases, could cause injury if not used properly.

Another issue in the prior art is that harnesses frequently interfere with an animal's gait because the harness' leash falls between the animal's legs while walking. Such failure allows the animal to pull with full force against the harness rendering the product unnecessary and leading to the similar issues described above. Some solutions have provided a "collapsing" aspect to the harness. Upon the animal applying pressure to the leash, the harness will collapse within a small range. While this temporarily alleviates the pulling issue and provides an initial signal to the animal to reduce pulling, once the harness collapses, the same issues described above remain.

What is needed is a system and method that can safely signal to an animal to stop pulling, and if the animal does not stop, further inhibit the pulling without incurring the types of harm that could come to the animal with the prior art systems.

SUMMARY

While the way in which the present invention addresses the disadvantages of the prior art will be discussed in greater detail below, in general, the present invention provides for preventing an animal from pulling on a leash with excessive force. In particular, the present invention provides an apparatus and a method comprising a top portion, a bottom portion, and a chest portion connected by rings that are fitted at the sides of the animal that upon forward pressure by the animal, the rings are forced together crosswise to the animal's motion, squeezing the leg's and discouraging further pulling.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description or may be learned by the practice of the invention.

BRIEF DESCRIPTION OF THE DRAWINGS

To describe the way the advantages and features of the present invention can be obtained, a more particular description of the present invention will be rendered by reference to specific embodiments and examples, which are illustrated in the appended drawings. Understanding that these drawings depict only typical embodiments of the invention and are not therefore to be limiting of its scope, the present invention will be described and explained with additional specificity and detail using the accompanying drawings in which.

DETAILED DESCRIPTION

Figure 1:
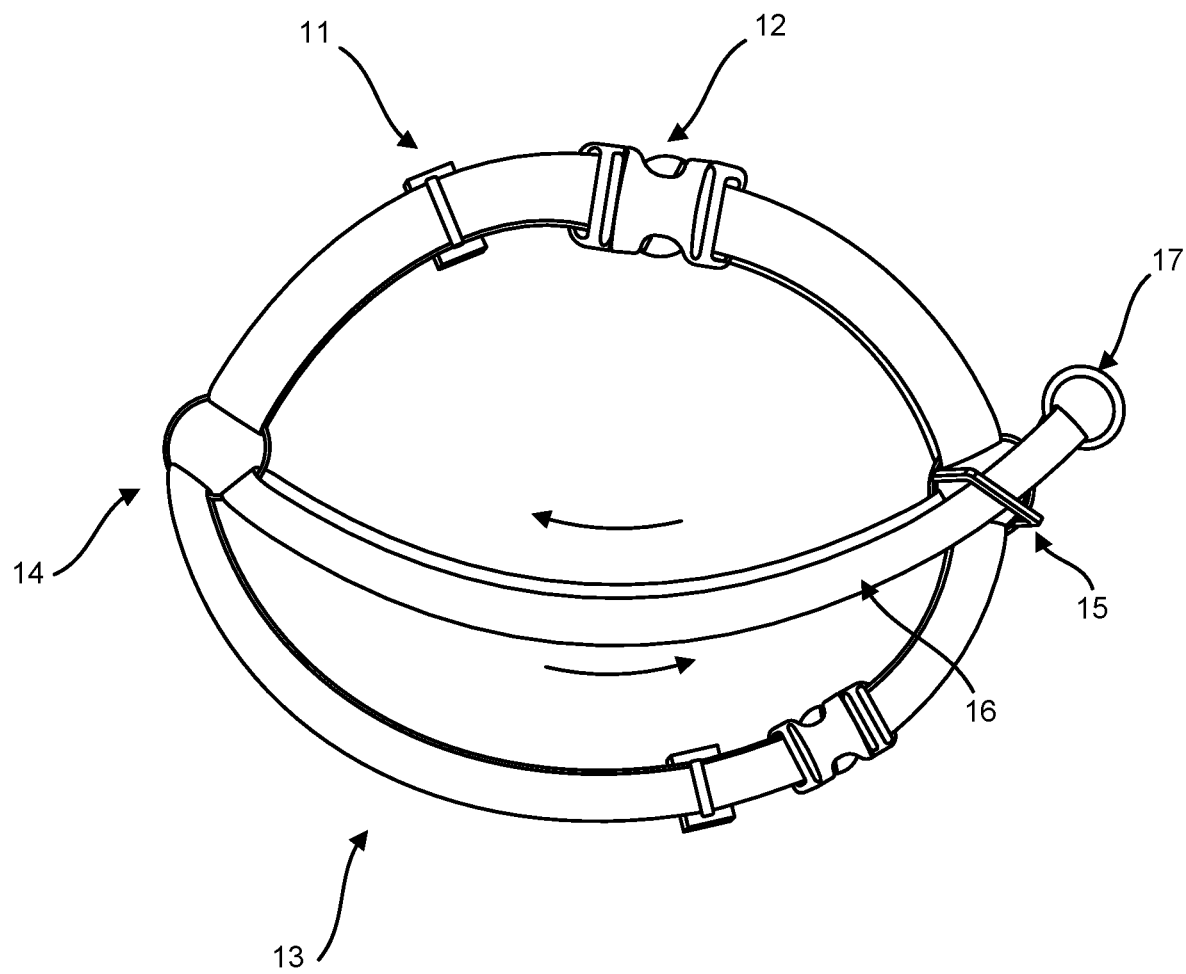
FIG. 1 illustrates an exemplary embodiment of a side lead harness configured for a dog.

Various embodiments of the invention are described in detail below. While specific implementations involving an animal harness are described, the description is merely illustrative and not intended to limit the scope of the various aspects of the invention. A person skilled in the relevant art will recognize that other components and configurations may be easily used or substituted than those that are described without parting from the spirit and scope of the invention. As will be appreciated by one of ordinary skill in the art, the system may be embodied as a customization of an existing system, an add-on product, and/or a stand-alone system.

As will become apparent from the following descriptions, the present invention discourages an animal excessively pulling on a harness while in motion, for example, walking or running. In particular, a side lead animal harness uses the pulling pressure of the animal to collapse the harness in a safe manner, restricting leg movement, and inhibiting forward movement by pulling the animal sideways.

A side lead animal harness includes components configured to discourage excessive pulling and to restrain an animal by "collapsing" the harness, which puts pressure on the animal's front legs that is crosswise to the animal's forward motion. The side lead harness includes a chest portion, a top portion, and a bottom portion. The portions are connected in a manner that allow the chest portion to collapse in an inward manner. A leash or similar device is attached to the chest portion of the animal. In some embodiments, the leash is attached to the chest portion at a single point of attachment. In other embodiments, the leash is attached to more than one portion of the harness. The harness may be used with a variety of animals. In an exemplary embodiment, the animal is a dog. In other embodiments, the animal is a cat. In other embodiments, the animal may be sheep, pigs, or goats.

The top portion is placed over or slightly behind the animal's shoulder blades. The bottom portion is placed under the animal and behind the animal's front legs. The top portion and the bottom portion are connected so that the portions are close-fitted to the animal. The top and bottom portions meet at each side of the animal above the elbow. The chest portion is operatively connected at each side of the animal to the top and bottom portions. The chest portion should be close-fitted across the animal's chest such that the portion does not ride up to the neck or fall to the leg areas of the animal. As the animal walks in a normal gait, the chest portion is firm against the chest but does not inhibit movement forward or movement of the head. In other words, the animal would be able to lower its head to the ground without much restraint. Should the animal begin to exert excessive pressure against the chest portion, for example, begin to pull harder or run, the chest portion connection points at the legs are forced together crosswise to the direction of the animal, which squeezes the animal's legs together. Additionally, the animal is forced to the side of the leash connection stopping forward momentum. This pressure is described as crosswise, which includes pressure that is diagonal, perpendicular, or substantially perpendicular to the forward motion of the animal. The pressure exerted by the harness is directly proportional to the pressure exerted by the animal on the chest portion. Once the animal reduces the pulling pressure, the chest portion expands, while still remaining close-fitted, which releases the pressure on the legs and enable regular movement. In some embodiments, the chest portion may be configured so that the proportionality of the pressure applied to the legs when collapsing is greater or less than 1:1 ratio.

The top, bottom, and chest portions may be formed of any suitable material. Nylon, cotton, cloth, polyester fabric, leather, or other materials may be used. The portions may also be configured as a panel or a strap. In exemplary embodiments, the portions are straps formed of nylon or cotton. In some embodiments, the portions include clips or buckles. In exemplary embodiments, the clips or buckles are adjustable.

The connections between the portions may be formed in a variety of ways. In some embodiments, the portions are sewn together. In other embodiments, the portions may be glued together. In exemplary embodiments, the portions are connected via metal rings. However, any suitable way to attach the portions while still maintaining the stated functionality are within the spirit of this disclosure.

FIG. 1 shows a front view of an exemplary embodiment of a side lead animal harness configured for a dog. The top portion 11 is a nylon strap with an adjustable buckle 12 for close-fitting around the dog. The top portion 11 is connected to the bottom portion 13, which is also a nylon strap with an adjustable buckle, by ring 14 and modified ring 15. The straps of FIG. 1 are secured to the rings by threading an end of a strap through the ring, folding a small portion of the strap back on itself, and sewing the small portion to the back of the strap. However, any suitable way to secure the straps to the rings known now or in the future is within the spirit of this disclosure.

Figure 1A:
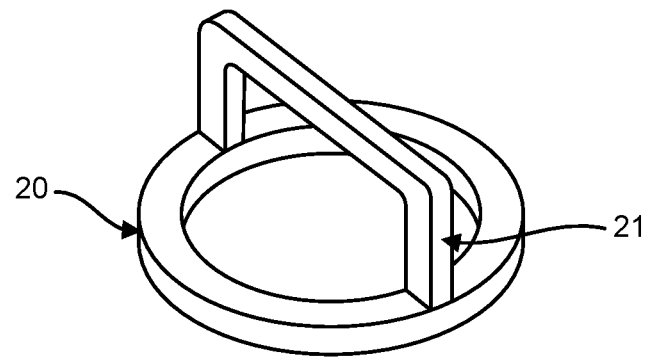
FIG. 1A illustrates an exemplary embodiment of modified rings used in FIG. 1.
Figure 1A:
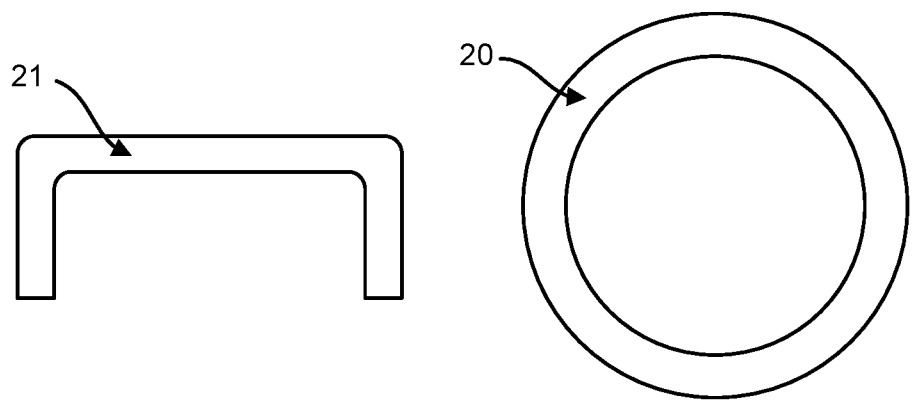
Figure 2:
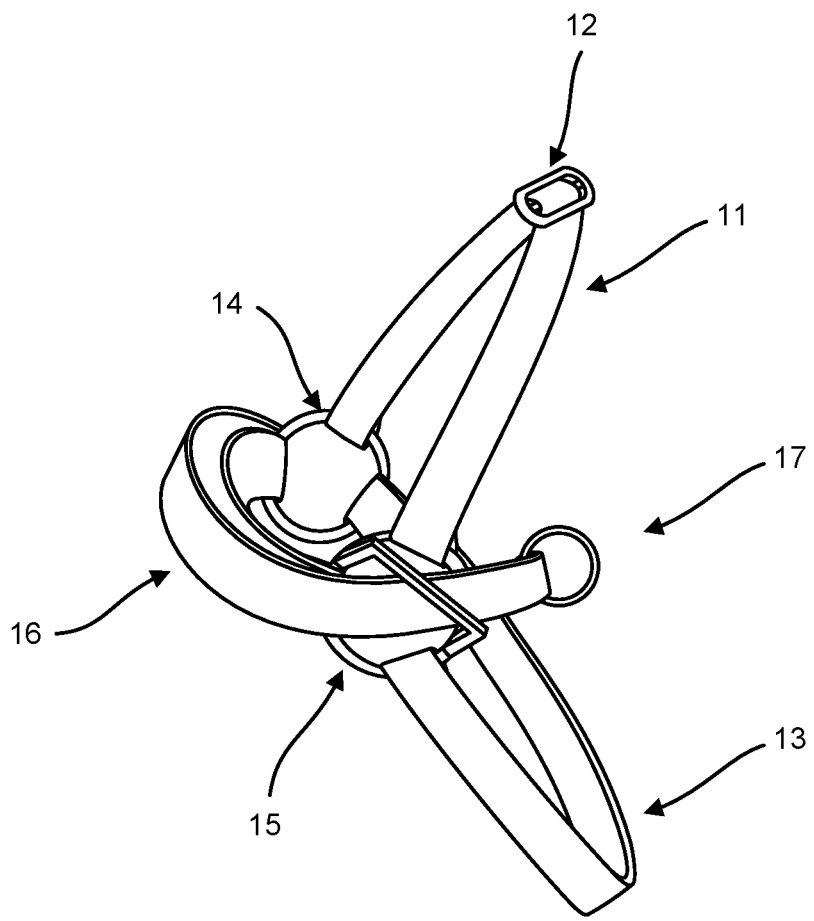
FIG. 2 illustrates a side view FIG. 1.

The chest portion 16 is a nylon strap that has one end attached to modified ring 15. The other end of the strap is threaded through ring 14 and doubled-back through modified ring 15. This strap end is attached to another ring 17, which can a ring or a modified ring. A leash or similar device for walking a dog is attached to ring 17. FIG. 1A shows an exemplary embodiment of the modified ring 15 of FIG. 1. The modified ring is comprised of a ring 20 and a run 21. The shape of the run 21 may vary with application. An exemplary shape is a rectangular. In other embodiments, the shape is a semi-circle. The run 21 is attached to the top of the ring 20. Any attachment method suitable to the materials and application is within the scope of this disclosure. In an exemplary embodiment, the ring 20 and run 21 are metal and the run 21 is welded onto the top of the ring 20. The end of the strap of chest portion 16 is threaded over the ring 20 and through the run 21 so that the strap freely moves over the ring 20. The run 21 contains the strap and acts as a stop for the strap so that ring 17 cannot pass back through the run 21. As the dog excessively pushes on the harness, the chest portion 16 is able to "collapse," which forces ring 14 and modified ring 15 together squeezing the legs together and pull the dog to the side. FIG. 2 shows a side view of the FIG. 1 harness.

Figure 3:
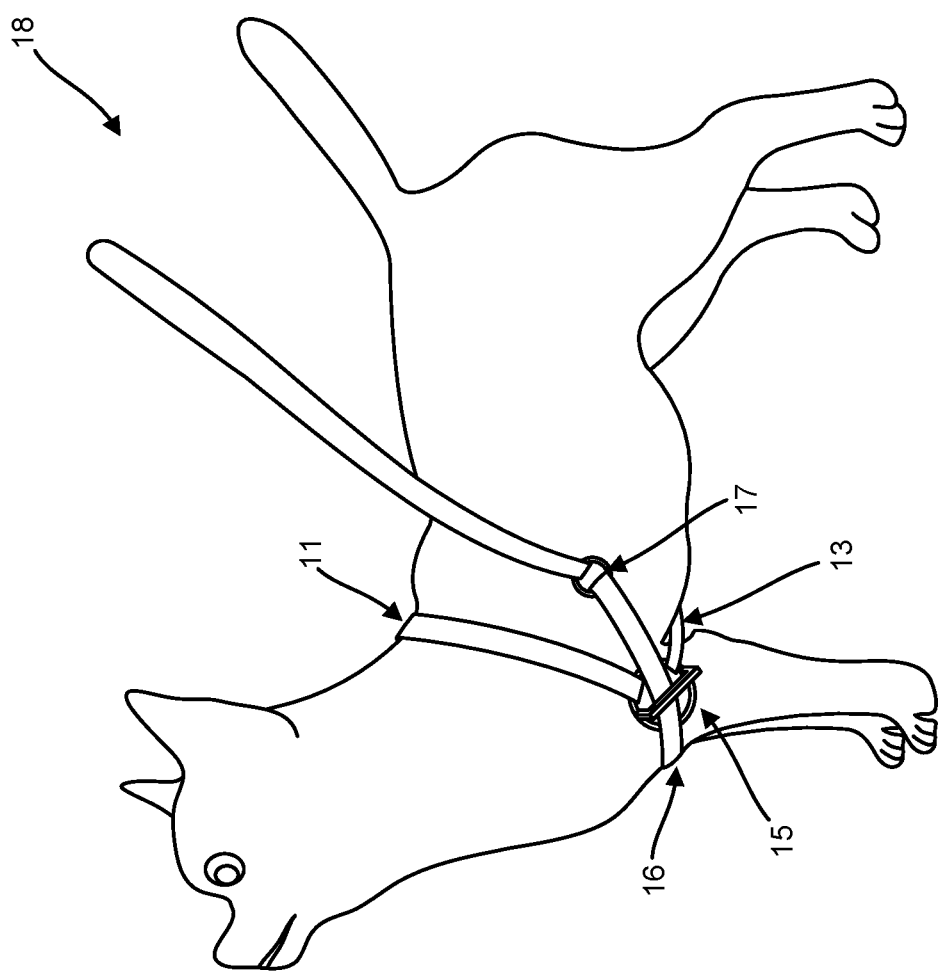
FIG. 3 illustrates an exemplary embodiment of a side lead harness as worn by a dog.

FIG. 3 shows an exemplary side lead harness as worn by a dog. As described above, the top portion 11 fits over the shoulder of the dog. The bottom portion 13 fits behind the legs of the dog. The chest portion 16 is fitted across the chest. These portions connect at modified ring 15. A leash 18 is attached to ring 17. As the dog increases pressure on the chest portion 16, rings 15 and 14 (not shown) squeeze the dog's legs together crosswise to discourage pulling and the leash 18 pulls the dog to the side inhibiting movement forward.

Although the above description may contain specific details, they should not be construed as limiting the claims in any way. Other configurations of the described embodiments of the invention are part of the scope of this invention. The descriptions and embodiments are not intended to be exhaustive or to limit the invention to the precise forms disclosed.

What is claimed is:

1. A side lead animal harness comprising:
a first ring and a second ring, the first ring having a run;
a top portion configured to fit over an animal's shoulder with a first end and a second end, the first end connected to the first ring and the second end connected to the second ring;
a bottom portion configured to fit under the animal and behind the animal's legs with a third end and a fourth end, the third end connected to the first ring and the fourth end connected to the second ring;
a chest portion with a fifth end and a sixth end, the fifth end connected to the first ring,
wherein:
(a) the sixth end pulls the chest portion across the animal's chest;
(b) the sixth end is threaded through the second ring;
(c) the sixth end pulls the chest portion back across the animal's chest; and
(d) the sixth end is threaded over the first ring and through the run; and
a lead operatively connected to the sixth end, wherein pressure by the animal on the chest portion forces the first ring and the second ring together, thereby squeezing the animal's legs together crosswise to a forward motion direction of the animal.

2. The harness of claim 1, wherein the animal is a dog.

3. The harness of claim 1, wherein the top portion, the bottom portion, and the chest portion are straps.

4. The harness of claim 3, wherein at least one of the straps has an adjustable buckle.

5. The harness of claim 1, wherein the ring and the run are metal.

6. A method for discouraging excessive pulling by a dog, the method comprising:
   fitting a first strap over the shoulder of a dog, the first strap attached to a first ring and a second ring, the second ring having a run attached to the second ring;
   fitting a second strap under the dog and behind the dog's legs, the second strap attached to the first ring and the second ring;
   attaching a first end of a chest strap to the second ring, threading the second end of the chest strap through the first ring and back towards the second ring;
   threading the second end of the chest strap over the second ring and through the run attached to the second ring;
   positioning the first ring on a first side of the dog and the second ring on a second side of the dog, wherein both rings are above the elbow of the dog; and attaching the chest strap to a leash,
      wherein pressure by the dog on the chest strap forces the first ring and the second ring together, thereby squeezing the legs together crosswise to a forward motion direction of the dog.

7. The method of claim 6, wherein the straps comprise an adjustable buckle.

* * * * *